United States Patent [19]

McCanse

[11] Patent Number: 4,948,162
[45] Date of Patent: Aug. 14, 1990

[54] TAIL WHEEL SPRING ARM ASSEMBLY
[75] Inventor: James E. McCanse, Oregon, Ill.
[73] Assignee: M & W Gear Company, Gilbson City, Ill.
[21] Appl. No.: 309,599
[22] Filed: Feb. 9, 1989
[51] Int. Cl.⁵ .............................................. B60G 3/16
[52] U.S. Cl. .................................... 280/699; 280/720; 280/767; 267/41; 56/15.6; 56/DIG. 10
[58] Field of Search ............... 280/699, 718, 720, 767; 267/41; 56/15.6, 15.9, DIG. 10, 10.1, 6

[56] References Cited

U.S. PATENT DOCUMENTS

| 1,186,583 | 6/1916 | King | 267/41 |
| 1,880,703 | 10/1932 | Bischoff et al. | 280/699 X |
| 3,053,033 | 9/1962 | Maguire | 56/6 |
| 3,334,476 | 8/1967 | Engler | 56/15.9 |
| 3,564,822 | 2/1971 | Engler | 56/15.9 X |
| 4,310,997 | 1/1982 | Streicher | 56/15.9 |
| 4,758,019 | 7/1988 | Tucker-Peake et al. | 280/699 |
| 4,829,754 | 5/1989 | Shimamura et al. | 56/6 X |

Primary Examiner—Charles A. Marmor
Assistant Examiner—Tamara L. Finlay
Attorney, Agent, or Firm—Allegretti & Witcoff, Ltd.

[57] ABSTRACT

A mechanism for connecting a trailing wheel to an implement, incorporates a spring arm which will absorb shock. The tension on the spring is adjustable.

1 Claim, 1 Drawing Sheet

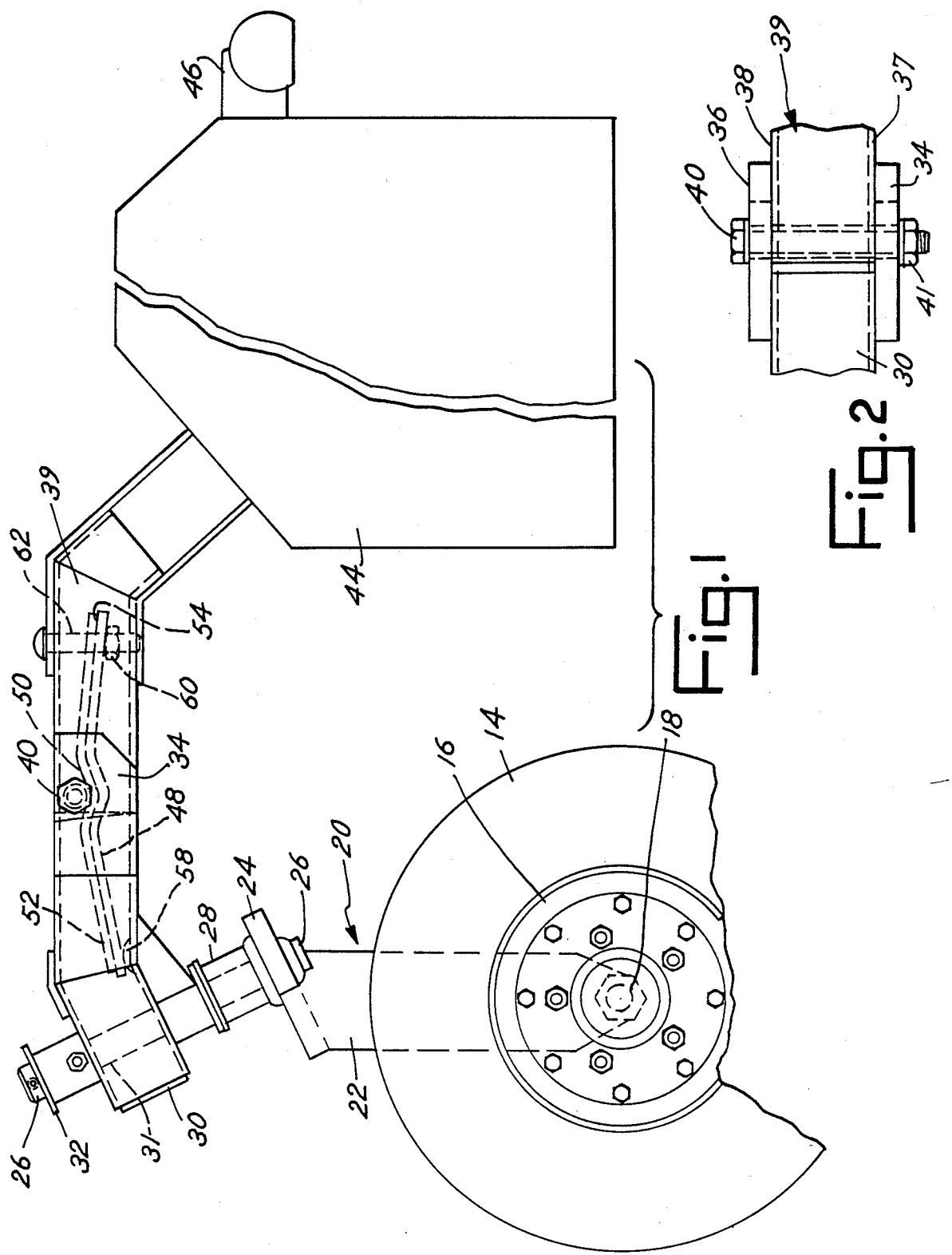

TAIL WHEEL SPRING ARM ASSEMBLY

BACKGROUND OF THE INVENTION

This invention relates to an improved wheel attachment assembly for use in combination with farm implements and the like. In the construction of mowers, planters and other implements for use in a farm environment, running gear such as a single trailing wheel may be attached to the implement by a cantilever arm. The wheel then trails the implement and supports the implement above the ground. The opposite end of the implement is usually attached to a hitch such as a three point hitch associated with a tractor or other prime mover.

Heretofore, the cantilever arm has been rigidly attached to such implement. Alternatively various complex mounting arrangements which provide for some type of shock absorption for the trailing wheel has been provided Thus there has remained a need an improved assembly for connecting a trailing wheel, such as a tail wheel, to an implement.

SUMMARY OF THE INVENTION

In the principle aspect the present invention comprises and improved mechanism for connecting a trailing wheel to an implement. The mechanism incorporates a spring arm mechanism which will absorb shocks and which will also provide for maintenance of level operation of the implement to which the trailing wheel is attached.

The mechanism includes two pairs of parallel plates which are pivotally connected to one another. One pair of the plates is attached to the trailing wheel. The second pair of plates is attached to the implement. A leaf spring is simultaneously biased against the trailing wheel as well as the implement and pivotal connection which connects the pairs of parallel opposed plates.

Thereby the trailing wheel is positively biased toward the ground and moves in response to uneven terrain by causing the spring to flex and the parallel plates pivot one pair with respect to the other.

Thus it is an object of the invention to provide an improved tail wheel spring arm assembly for use particularly with trail wheels associated with support of implements such as farm implements.

It is the further object of the invention to provide an improve tail wheel spring arm assembly which has an economy of manufacture and efficiently of operation relative to prior assemblies.

These and other objects, advantages and features of the invention will be set forth in a detailed description which follows.

BRIEF DESCRIPTION OF THE DRAWING

In the detailed description which follows, reference will be made to the drawing comprised of the following Figures:

FIG. 1 is a side elevation depicting the spring arm assembly of the invention.

FIG. 2 is a top plan view of the spring construction associated with the construction of FIG. 1.

DESCRIPTION OF THE PREFERRED EMBODIMENT

Referring to the Figures, and in particular to FIG. 1 there is a disclosed a running gear which is comprised of a tire 14 attached to a hub 16. The hub 16 is supported on a spindle and shaft assembly or axle 18. The axle 18 connects with a yoke 20 that includes an upwardly extending plate or arm 22 and connected to a cross plate or bracket 24. Projecting generally upward from the bracket 24 is a shaft or pin 26. The shaft or pin 26 includes a bushing 28 at the lower end thereof. A separate tubular member 30 includes a passage 31 therethrough defining a bearing which is journaled on the shaft 26. The member 30 is retained on the shaft 26 by means of a lock or retention washer 32.

Projecting horizontally from the square cross section tubular member 30 is a first pair of a generally spaced parallel plates 34 and 36. The plates 34 and 36 extend outwardly in a generally horizontal fashion. The plates 34 and 36 are parallel to one another and spaced from one another and define generally vertical planes. Cooperative with and attached to the first pair of parallel plates 34 and 36 are a second pair of parallel spaced plates 37 and 38 defining the sides of a square tubular bracket 39. A bolt 40 extends through horizontal aligned openings in the plate 34, 36, 37 and 38 to pivotally them in pairs to one another. Thus the plates 34 and 36 can pivot about the axis of the bolt 40 with respect to plates 37 and 38. Nut 41 retains the bolt 40 pivot shaft The second pair of plates 37 and 38 and more particularly the tube or bracket 39 connects with an implement 44 such as a mower or the like. The implement 44 is then attached by a hitch 46 such as a ball and socket hitch connected to a prime mover such as a tractor (not shown).

A leaf spring assembly 48 within the square cross section tubular brackets 30 and 39. The intermediate section of spring assembly includes a detent 50 which fits against the bolt 40. The opposite ends 52 and 54 of the leaf spring assembly are connected or impinge respectively against a bracket or knob 58 associated with the tubular bracket 30 and a nut 60 supported by bolt 62 attached to bracket 39. Nut 60 is thus suspended from a bracket 39. In this manner the leaf spring assembly 48 adjustably biases the tail wheel construction, as described, downwardly against the surface of the terrain by adjusting the nut 60 on the bolt 62. It is possible to vary the tension in the spring assembly 48 and thus provide for adjustment of the biasing of the spring arm assembly.

Of course, the spring arm assembly 48 can be comprised on any number of leaf springs arranged in a composite fashion to provide for adjustment of the spring arm tension It is also possible to otherwise vary the construction of the invention from the preferred embodiment just described The subject matter of the invention is therefore to be limited only by the following claim and equivalents.

What is claimed is:

1. An improved tail wheel spring arm assembly for a farm implement and other apparatus comprising, in combination:
   a. running gear including a wheel having an axle, a yoke assembly attached to the axle to permit the wheel to rotate about the axle, said yoke assembly including an upstanding shaft for attachment to a spring arm means;
   b. spring arm means comprising a first pair of opposed generally parallel, laterally extending plates spaced one from the other and defining at one end a mean for a pivotal attachment to the shaft, said spring arm means further including a second pair of opposed generally parallel spaced plates arranged in opposed relation to the first pair of plates and pivotally connected to the first pair of plates by pin means such that the plates are pivotal in pairs, one with respect to the other, said second pair of plates being attached to the implement;

c. a leaf spring having opposite ends the implement and the shaft engaging the opposite ends respectively, said leaf spring having an intermediate portion adjustably biased against the pin means connecting the pairs of plates, whereby the spring means positively biases the running gear towards the ground; and d. adjustable biasing means for engaging one end of the spring with the implement.

* * * * *